United States Patent [19]

Ishii et al.

[11] Patent Number: 4,583,224
[45] Date of Patent: Apr. 15, 1986

[54] FAULT TOLERABLE REDUNDANCY CONTROL

[75] Inventors: Kazuhiko Ishii; Atomi Noguchi; Yoshimi Gotoh, all of Hitachi, Japan

[73] Assignee: Hitachi, Ltd., Tokyo, Japan

[21] Appl. No.: 549,435

[22] Filed: Nov. 7, 1983

[30] Foreign Application Priority Data

Nov. 8, 1982 [JP] Japan .................. 57-194516

[51] Int. Cl.[4] .............................. G06F 11/00
[52] U.S. Cl. ........................ 371/36; 371/16
[58] Field of Search .............. 371/16, 36, 11, 67, 371/68

[56] References Cited

U.S. PATENT DOCUMENTS

| | | |
|---|---|---|
| 4,345,327 | 8/1982 | Thuy ................. 371/36 |
| 4,375,683 | 3/1983 | Wensley .............. 371/36 |
| 4,392,199 | 7/1983 | Schmitter et al. ..... 371/36 |
| 4,403,333 | 9/1983 | Gupta ................ 371/36 |

OTHER PUBLICATIONS

Wensley, J. H., "Fault Tolerant Techniques for Power Plant Computers", 1981 Power Industry Computer Application Conference, May 1981.

Manuel, "Computers People Can Count On", Electronics, Jan. 27, 1983, pp. 93-105.

*Primary Examiner*—Michael R. Fleming
*Attorney, Agent, or Firm*—Antonelli, Terry & Wands

[57] ABSTRACT

A redundant control system in which three output signals from three equivalent signal processors are compared with each other to judge whether each of the output signals is normal or abnormal, an abnormal output signal thus determined is replaced by a set signal having a predetermined level, and then a majority operation is performed for normal output signals and the set signal to obtain a control signal. The control signal is formed of the logical product or logical sum of two normal output signals according as the predetermined level of the set signal is "1" or "0". In the case where a circuit for generating the above-mentioned control signal are formed in triplicate and a majority operation is performed for three control signals, a fault occurring at other circuit portions than a majority logic circuit at the final stage is permissible. Further, the reliability of the control system is enhanced by forming abnormality detecting means in triplicate and performing a majority operation for the outputs of three abnormality detecting means.

13 Claims, 6 Drawing Figures

2/3 LOGIC  62

ERROR DETECT  63

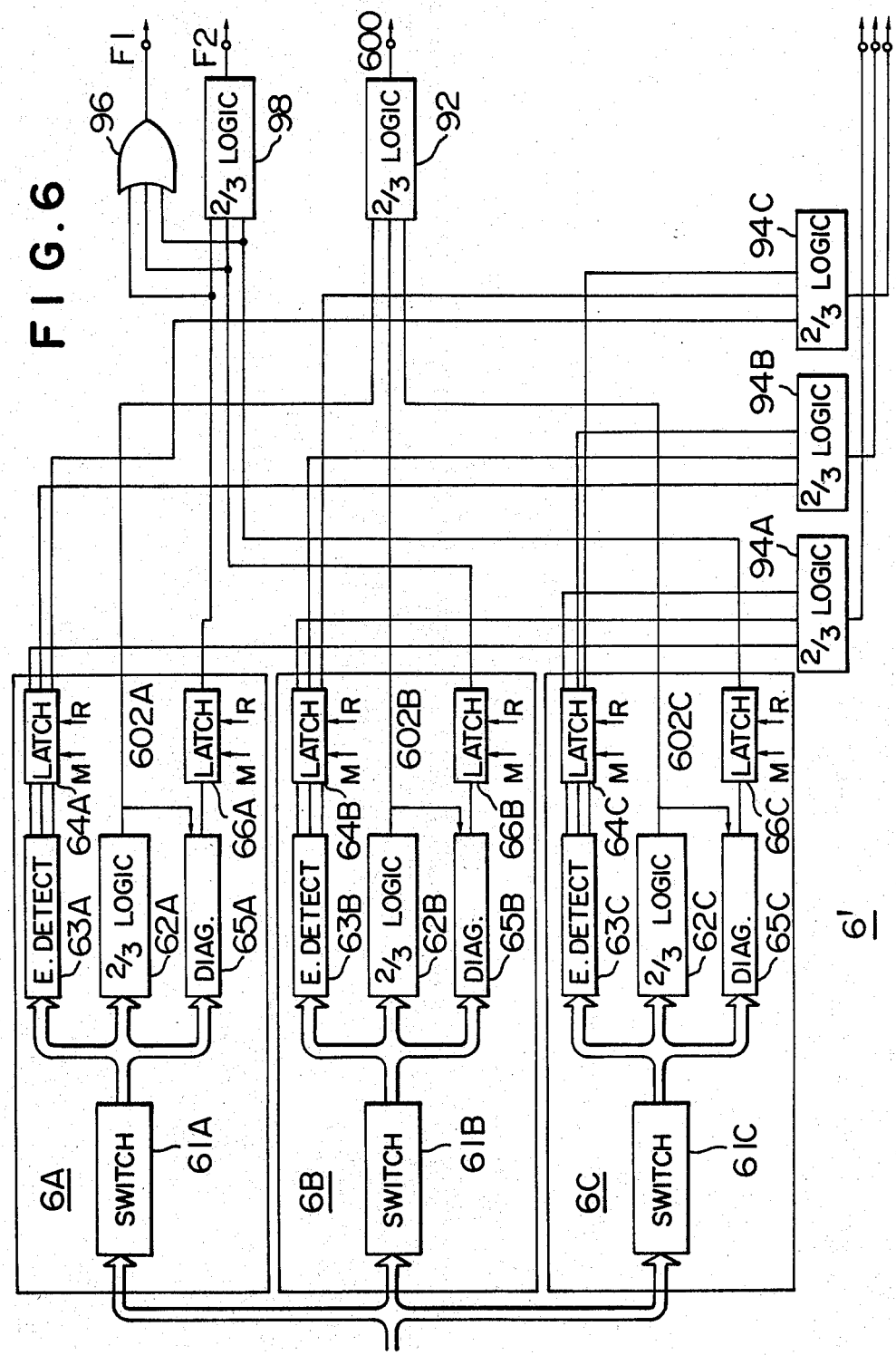

FAULT TOLERABLE REDUNDANCY CONTROL

BACKGROUND OF THE INVENTION

The present invention relates to redundancy control, and more particularly to the fault tolerable redundancy control using majority voting logic.

In many of the cases where an apparatus required to have high reliability, such as an atomic power plant, is automatically controlled, a control system for the apparatus is made redundant. For example, in the case where an object to be controlled is controlled by a single control signal generated on the basis of the output signal of a single sensor, a signal processing system is formed in triplicate to form three control signals, and then a two-out-of-three majority logic operation (hereinafter referred to as a "$\frac{2}{3}$ logic operation") is performed for the above control signals to obtain the single control signal. Accordingly, even when a fault occurs in one of three signal processing systems, normal control can be insured provided that the remaining signal processing systems operate normally.

Such a majority logic control system can be formed by using relays or a semiconductor IC. Reference is made to "Electronics" Jan. 27, 1983 (McGRAW-HILL PUBLICATION).

In the case where the $\frac{2}{3}$ logic control method is carried out, a fault in one of three control systems causes no trouble. However, there arises a problem when a fault further occurs in a second control system. That is, when the signals of two control systems are fixed by faults to energize (or de-energize) an object, the to-be-controlled object continues to-be energized (or de-energized) even if the remaining control system performing a normal operation indicates that the object is to be de-energized (or energized).

In the case where it is dangerous to continue energization of the to-be-controlled object, it is desired to stop the operation of the controlled object at the time of a fault so as to control the object to be on the safe side. Further, in the case where the to-be-controlled object is a safety device, it is desirable to ensure the safety by continuing the operation of the safety device when a fault occurs in a control system. Further, it is desirable to inform an operator of a fault position when a fault occurs, to make it possible to repair a faulty portion or replace parts.

SUMMARY OF THE INVENTION

It is an object of the present invention to provide a fault tolerable redundant control system in which, when a fault occurs in one of the control channels, the remaining normal control channels can perform a desired control operation.

According to the present invention, equivalent control signals are compared with each other, and one control signal different in level from the remaining control signals is considered to be a fault or error signal. A fixed signal having a predetermined level is supplied to a majority logic circuit in place of the error signal, regardless of the level of the error signal. Thus, when one of three inputs of the majority logic circuit is fixed so as to have the level of "1", the logic circuit is equivalent to an OR gate applied with the remaining inputs. When one of the three inputs is fixed so as to have the level of "0", the majority logic circuit is equivalent to an AND gate applied with the remaining inputs.

By indicating a control channel corresponding to the error signal on display means, it is possible to inform an operator and others of the generation of a fault.

Further, when the majority logic circuit is provided with a self-diagnosing circuit, a fault in the majority logic circuit can also be found.

In the case where a plurality of control circuits each having such a circuit structure as mentioned above are provided, a fault in the signal processor and control circuit except for a majority logic circuit at the final stage is permissible.

When a redundant control circuit such as mentioned above is formed on a semiconductor chip in the form of an IC, the failure rate per constituent circuit element is reduced, and the reliability is increased. Further, the number of fabricating steps for forming the IC is determined independently of the number of constituent circuit elements. Accordingly, the manufacturing cost of the IC is relatively low though a large number of circuit elements are formed on the semiconductor chip.

Further, when the redundant control circuit is provided with various function circuits, it is possible to take appropriate countermeasures in time of failure.

A desired fail-safe control operation can be continued even after the occurrence of faults in two of the three control channels, by previously determining which one of the signals having the level of "1" and "0", is to be substituted for the error signal.

Other objects, features and advantages of the present invention will become apparent from the following explanation of embodiments taken in conjunction with the accompanying drawings.

BRIEF DESCRIPTION OF THE DRAWINGS

The present invention will be apparent from the following detailed description taken in conjunction with the accompanying drawings, in which:

FIG. 6 is a block diagram showing another embodiment of a majority logic control circuit according to the present invention.

DESCRIPTION OF THE PREFERRED EMBODIMENTS

Figure 1:
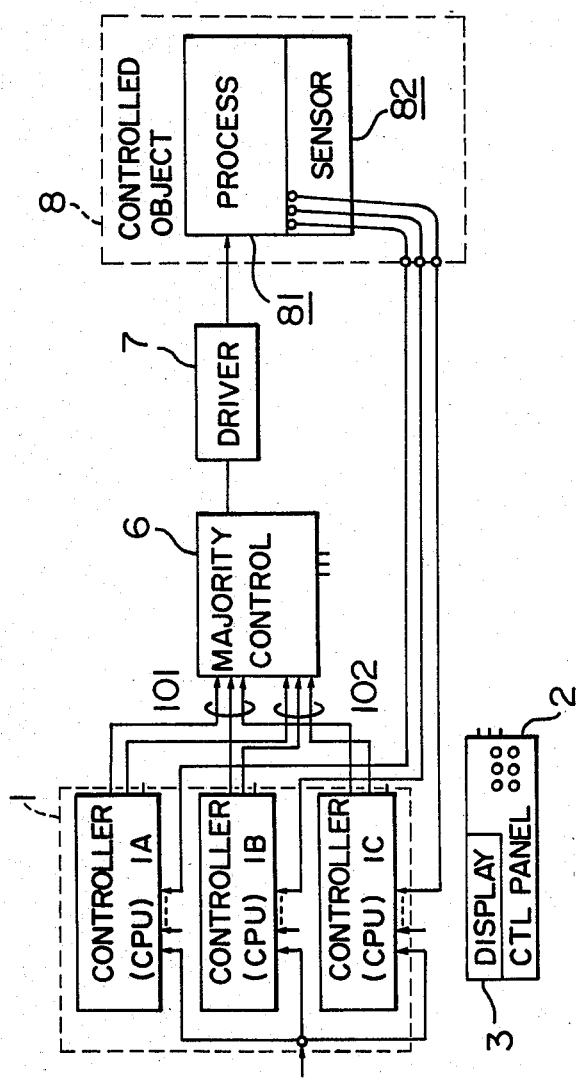
FIG. 1 is a block diagram showing an outline of a threefold control system.

FIG. 1 shows an outline of a threefold control system. Referring to FIG. 1, controller circuits each including a signal processor, for example, central processing units (CPU's) 1A, 1B and 1C have the same function, operate independently of each other, and deliver channel output signals. The channel output signals are applied to a majority voting control circuit 6 in which a majority voting operation is performed for the channel output signals to form a system control signal. The system control signal is applied to a driver circuit 7, the output of which is used for controlling a process 81. The process 81 is monitored by sensors 82, and monitor signals from the sensors 82 are applied to the controller circuits 1A, 1B and 1C, to form an automatic control loop. The controller circuits 1A, 1B and 1C may be further connected to receive a control signal from a host computer or the like (not shown). The state of the control system is displayed on a display device 3, and controlled by control switches on a control panel 2. For example, the controllers 1A, 1B and 1C may supply the informations on abnormal states of the system, e.g. error detection information as described below in connection with FIG. 2, WDT errors in the controllers, etc. to the display 3. They may also have control switches. The switches on the control panel 2 may select the set signal and generate a reset signal as will be described below.

Though three equivalent sensors are shown in FIG. 1, the controller circuits 1A, 1B and 1C may receive the output of a single sensor in common. Further, the ground level isolation and signal level shifting may be made arbitrarily by means of a photo-coupler or other means, if necessary.

Figure 2:
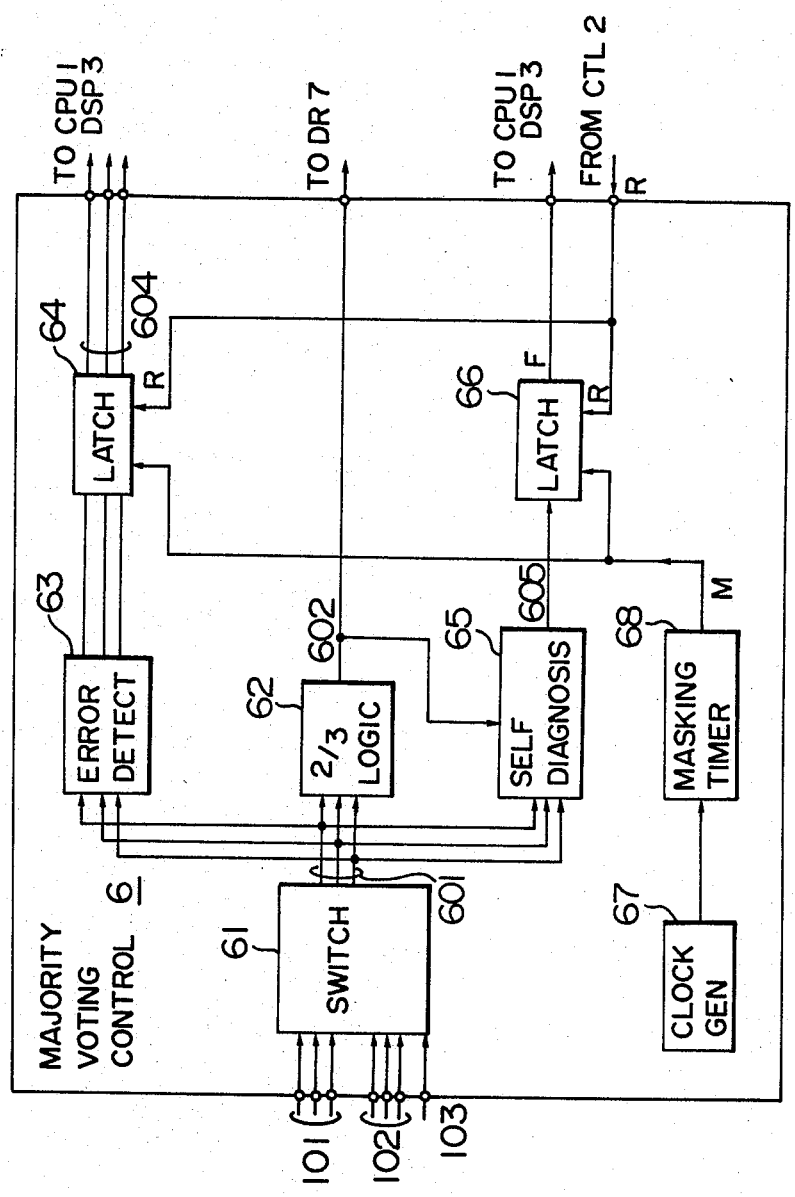
FIG. 2 is a block diagram showing an embodiment of a majority logic control circuit used in the control system of FIG. 1.

FIG. 2 shows the fundamental circuit configuration of the majority voting control circuit 6. A switching circuit 61 is supplied with three input signals 101, three changeover signals 102 each indicating whether a corresponding input signal is normal or abnormal, and a set signal 103 from the CPU's 1A, 1B and 1C (and the control panel 2). When all of the changeover signals 102 take a level of "0", the input signals 101 are outputted from the switching circuit 61 as they are. When one of the changeover signals 102 takes a level of "1", one of the input signals 101 which corresponds to the changeover signal having the level of "1", is discriminated as abnormal, cut off and changed over to the set signal 103 by the switching circuit 61. Three output signals from the switching circuit 61 are applied to a ⅔ logic circuit 62, an error detecting circuit 63 and a self-diagnosing circuit 65 which are connected in parallel. The ⅔ logic circuit 62 performs a majority operation for three inputs thereof, and the output of the ⅔ logic circuit 62 is supplied to the driver circuit 7 and others. The error detecting circuit 63 compares three inputs thereof, and delivers three outputs in the following manner. When all of three inputs take the same level, three output lines are kept at the level of "0". When one of the inputs is different in level from the remaining inputs, a control channel corresponding to the one input is judged faulty, and a corresponding output line is set at the level of "1". The three output signals from the error detecting circuit 63 are latched by a latch circuit 64 for a predetermined time, and then supplied (as signals 604) to the CPU's 1A, 1B and 1C and to the display 3. When one of the signals supplied to the CPU's takes the level of "1", the level of a corresponding changeover signal 102 is changed to "1". The previously-mentioned changeover of the error signal to the set signal is performed on the basis of the changeover signal 102 having the level of "1".

The self-diagnosing circuit 65 includes a majority logic circuit equivalent to the ⅔ logic circuit 62, and a comparator for comparing the output of the majority logic circuit with the output of the ⅔ logic circuit 62. When these outputs are different from each other, the ⅔ logic circuit 62 is judged faulty, and a signal having the level of "1" is sent from the self-diagnosing circuit 65 to a latch circuit 66. After a predetermined time has elapsed, the latched signal is sent to the display device 3, the CPU1 or the like, to give an alarm for the fault. Each of the latch circuits 64 and 66 delivers an output signal upon release of a masking signal M from a masking timer 68, and is reset by a reset signal R which may be supplied from the control panel 2. The masking timer 68 receives clock pulses from a clock generator 67, and counts up a predetermined number of clock pulses to obtain the masking signal M of a predetermined duration.

Needless to say, the input and output signals of each of the circuits 61 to 68 can be also used for other purposes.

The set signal 103 may be supplied from the controllers 1A, 1B and 1C as well as from the control panel 2, based on WDT error, the result of parity check, etc. In such a case, automatic separation (degenerate operation) of the control system can be achieved.

Figure 3:
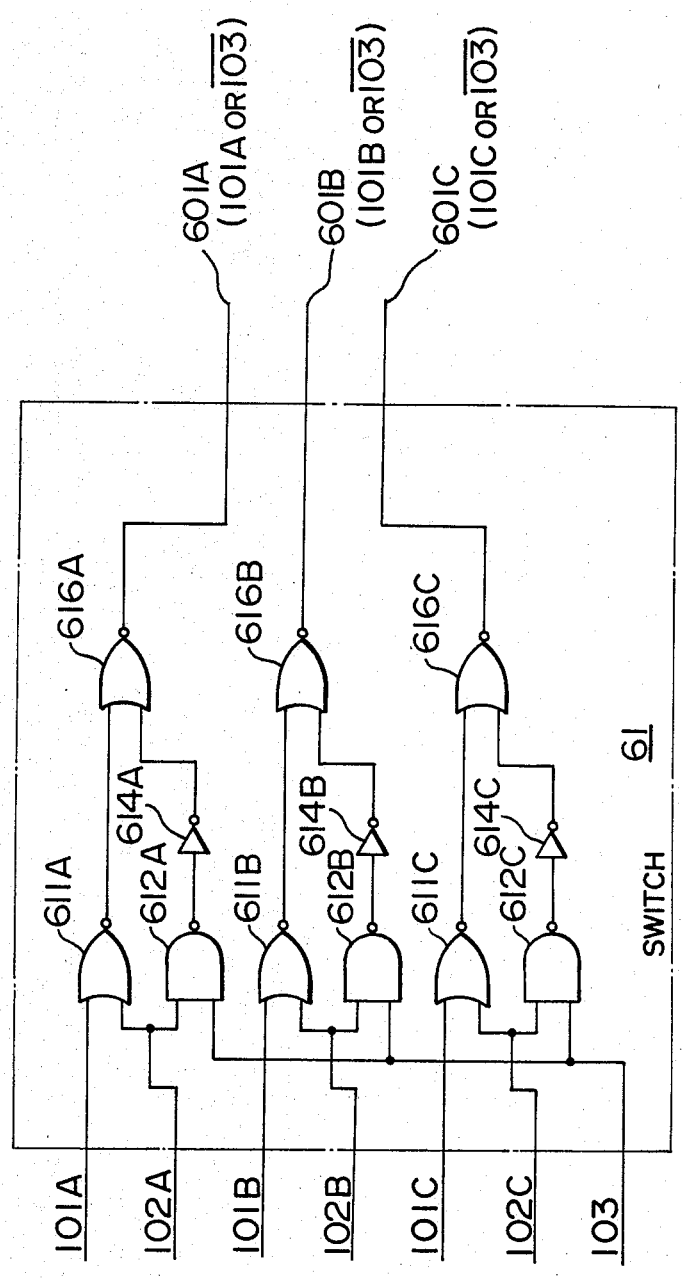
FIG. 3 is a circuit diagram of the switching circuit shown in FIG. 2.

FIG. 3 shows the circuit configuration of the switching circuit 61. The switching circuit shown in FIG. 3 includes three control channels A, B and C of the same circuit structure. Now, let us consider the control channel A, by way of example. The output of an NOR gate 611A applied with a control input signal 101A and a changeover signal 102A is supplied to one input terminal of an NOR gate 616A, and the output of an NAND gate 612A applied with the changeover signal 102A and set signal 103 is supplied through an inverter 614A to the other input terminal of the NOR gate 616A. It is obvious that the series combination of the NAND gate 612A and inverter 614A may be replaced by a single AND gate. When the changeover signal 102A has the level of "0", the output of the NAND gate 612A always takes the level of "1", and therefore the output of the inverter 614A always takes the level of "0". Accordingly, the control signal 101A is inverted by the NOR gate 611A, and then again inverted by the NOR gate 616A to form an output signal. That is, when the changeover signal 102A takes the level of "0", the control signal 101A is outputted from the NOR gate 616A as it is, to form an output signal 601A. The same circuit operation as mentioned above is performed in each of the control channels B and C. Output signals 601A, 601B and 601C thus formed are supplied to the ⅔ logic circuit 62. When the changeover signal 102A takes the level of "1", the output of the NOR gate 611A takes the level of "0", independently of the level of the control signal 101A, and therefore the output of the inverter 614A is inverted by the NOR gate 616A to form the output signal 601A. Further, since the changeover signal 102A has the level of "1", the set signal 103 is inverted by the NAND gate 612A. Accordingly, when the changeover signal 102A takes the level of "1", the inverted signal of the set signal 103 is always outputted from the NOR gate 616A to form the output signal 601A, since the set signal 103 is inverted three times by the circuits 612A, 614A and 616A. The same circuit operation as mentioned above is performed in each of the control channels B and C.

Figure 4:
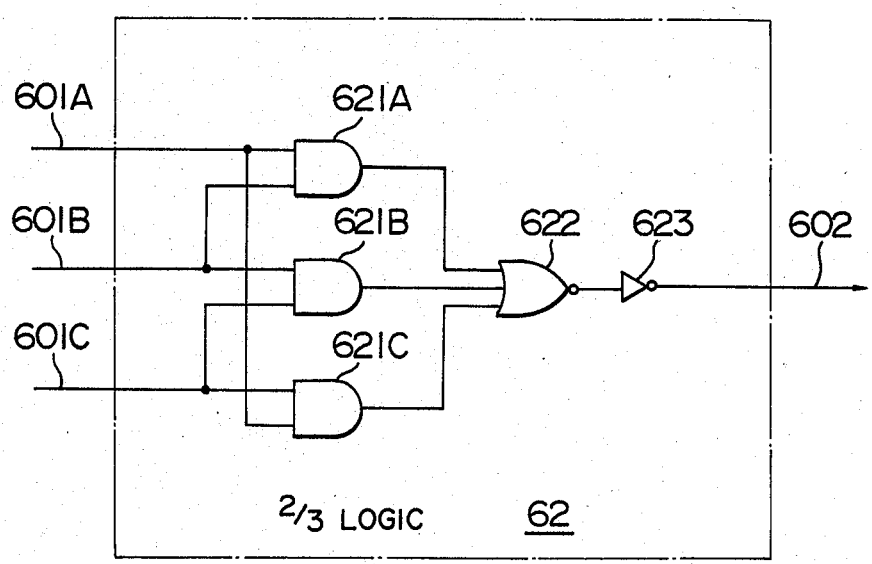
FIG. 4 is a circuit diagram of the $\frac{2}{3}$ logic circuit shown in FIG. 2.

FIG. 4 shows the circuit configuration of the ⅔ logic circuit 62. The ⅔ logic circuit 62 has three control channels A, B and C of the same circuit structure, and includes AND gates 621A, 621B and 621C, a common NOR gate 622 applied with the outputs of the AND gates 621A, 621B and 621C, and a common inverter 623 applied with the output of the NOR gate 622. Such a circuit configuration of ⅔ logic circuit is well known. In the ⅔ logic circuit 62 mentioned above, when at least two of three input signals take the level of "0" (or "1"), a majority decision output signal 602 takes the level of "0" (or "1").

Figure 5:
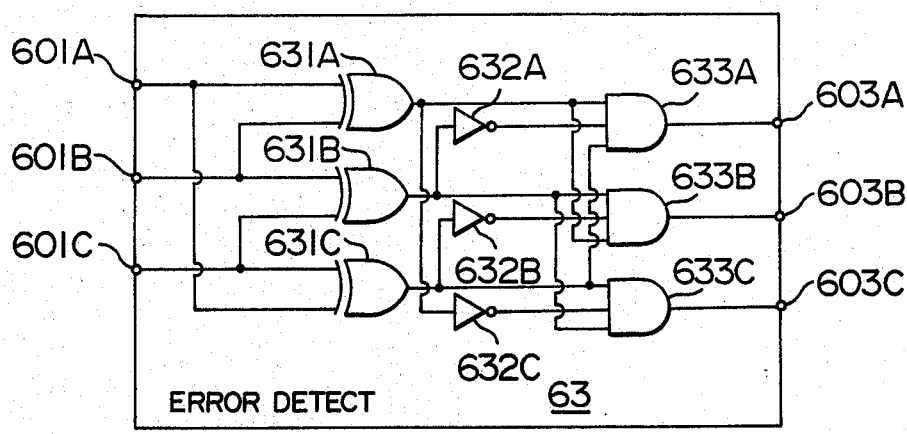
FIG. 5 is a circuit diagram of the error detecting circuit shown in FIG. 2.

FIG. 5 shows the circuit configuration of the error detecting circuit 63. The circuit 63 includes three control channels A, B and C of the same circuit structure.

Further, each of exclusive OR gates 631A, 631B and 631C is applied with predetermined two of the signals 601A, 601B and 601C, and the output of each exclusive OR gates is supplied to AND gates 633A, 633B and 633C directly or through one of inverters 632A, 632B and 632C. When one of the signals 601A, 602B and 603C is different in level from the remaining ones, a corresponding one of output signals 603A, 603B and 603C takes the level of "1". For example, when only the signal 601A takes the level of "0", each of the exclusive OR gates 631A and 631C delivers a signal having the level of "1", and the exclusive OR gate 631B delivers a signal having the level of "0". Before applied to the AND gate 633A, the signal from the exclusive OR gate 631B is inverted by an inverter 632A. Accordingly, the output signal 603A of the AND gate 633A takes the level of "1". Similarly, when only the signal 601A takes the level of "1", the output signal 603A takes the level of "1". As mentioned above, when one of three input signals is different in level from the remaining ones, that is, an error signal is present, an output 603A, 603B or 603C of the error detecting circuit 63 corresponding to the error signal takes the level of "1". The outputs of the circuit 63 are applied to the CPU's 1A, 1B and 1C (shown in FIG. 1) through the latch circuit 64. In one of the CPU's 1A, 1B and 1C which is applied with the output of the error detecting circuit 63 having the level of "1", the level of a corresponding changeover signal, for example, the changeover signal 102A is changed from "0" to "1". In the case where the level of the preset signal is "1", the corresponding output 601A of the switching circuit 61 takes the level of "0". Accordingly, the output 602 of the ⅔ logic circuit 62 takes the level of "1" only when both of the control signals 101B and 101C take the level of "1", and takes the level of "0" for other combinations of the levels of the control signals 101B and 101C. In other words, the ⅔ logic circuit 62 outputs the logical product of the control signals 101B and 101C. In the case where the level of the set signal is "0", the output 601A of the switching circuit 61 takes the level of "1". Accordingly, the output 602 of the ⅔ logic circuit 62 takes the level of "1" when at least one of the control signals 101B and 101C has the level of "1". That is, the ⅔ logic circuit 62 outputs the logical sum of the control signals 101B and 101C. As mentioned above, when one of three output signals from the error detecting circuit 63 is different in level from the remaining output signals, the switching circuit 61 cut off one of the control signals which corresponds to the output signal of different level, and determines which logic, i.e. the logical product or the logical sum, of the remaining control signals is outputted from the ⅔ logic curcuit 62.

Further, each of the latch circuits 64 and 66 is provided to mask an instantaneous error signal due to the asynchronism of the signals 601A, 601B and 601C and others, or the transient instability of circuit state. When the signals 601A, 601B and 601C do not coincide with each other for a period longer than a masking time set by the masking timer 68, a non-coincidence signal 604 and a logic fault signal F are delivered from the latch circuits 64 and 66, respectively. The non-coincidence signal 604 and the logic fault signal F can be reset by a reset signal R which is given manually by an operator in the control panel 2.

The self-diagnosing circuit 65 for the ⅔ logic circuit 62 judges whether the output signal 602 of the ⅔ logic circuit 62 is the correct result of a majority operation for three output signals 601A, 601B and 601C of the switching circuit 61 or not. That is, the self-diagnosing circuit 65 includes therein a majority logic circuit to compare the output thereof with the output 602 of the ⅔ logic circuit 62. When these outputs do not coincide with each other, the output signal 605 of the self-diagnosing circuit 65 takes the level of "1" to indicate a fault in the ⅔ logic circuit 62. The output signal 605 is made free from the transient instability of circuit state by the latch circuit 66, and then supplied, as the logic fault signal F, to the CPU's 1A, 1B, 1C, display device 3, and others. Thus, the operator is informed of the fault, and therefore it is possible to repair or replace the ⅔ logic circuit 62. The logic fault signal F is reset by the reset signal R which is given manually by the operator. Needless to say, a controlled object 8 (shown in FIG. 1) can be controlled to the safety side by using the logic fault signal F, if necessary.

The masking timer 68 is formed of a counter, and a masking time T is set in accordance with the purpose of the control system in such a manner that a predetermined number of clock pulses from the clock generator 67 are counted up by the counter. When the masking time T has elaspsed, a masking signal M from the masking timer 68 is put in the OFF-state.

FIG. 6 shows another majority control circuit according to the present invention. The majority control circuit 6' shown in FIG. 6 includes three majority control circuits 6A, 6B and 6C each equivalent to the majority control circuit 6 shown in FIG. 2. Accordingly, even when a fault occurs in one of the circuits 6A, 6B and 6C, for example, the majority control circuit 6A, a normal control operation is surely performed. In the majority control circuit 6 shown in FIG. 2, the system control signal 602 becomes unreliable when a fault occurs in the switching circuit 61, since the output signal 601 of the switching circuit 61 is unreliable at this time. However, in the majority control circuit 6' shown in FIG. 6, a normal control operation is performed even when a fault occurs in one of three switching circuits 61A, 61B and 61C. The above-mentioned fact holds for a fault in the ⅔ logic circuit 62.

Three output signals 602A, 602B and 602C from three ⅔ logic circuits 62A, 62B and 62C are applied to a ⅔ logic circuit 92, and a majority output signal is delivered from the ⅔ logic circuit 92 to form a system control signal 600. So long as no fault occurs in the ⅔ logic circuit 92 at the final stage, the reliability of the control system is maintained even if a single fault occurs in a given portion of the majority control circuit 6'. A self-diagnosing circuit may be added to the ⅔ logic circuit 92.

Each of three error detecting circuits 63A, 63B and 63C compares three input signals, and the circuits 63A, 63B and 63C make such comparison independently of each other. When one of the three input signals is different in level from the remaining input signals, an error detection signal is outputted to an output line corresponding to the input signal having a level different from the level of other input signals. Thus, when one of the three input signals is the error signal, three error detection signals are supplied through latch circuits 64A, 64B and 64C to one of ⅔ logic circuits 94A, 94B and 94C which corresponds to the error signal. Let us consider the case where a fault occurs in the CPU 1A, by way of example. In this case, the control signal 101A is the error signal, and three signals each having the level of "1" are applied to the ⅔ logic circuit 94A. Even when faults occur in one error detecting circuit 63A, 63B or 63C and one latch circuit 64A, 64B or 64C, the faults will be permissible and correct judgment will be formed as long as the faulty error detecting circuit and faulty latch circuit are included in one and the same channel.

Three self-diagnosing circuits 65A, 65B and 65C check the operations of the ⅔ logic circuits 62A, 62B and 62C, respectively. When a fault occurs in one of the ⅔ logic circuits 62A, 62B and 62C, the output signal of a corresponding self-diagnosing circuit 65A, 65B or 65C takes the level of "1". The output signals of the self-diagnosing circuits 65A, 65B and 65C are applied to latch circuits 66A, 66B and 66C, respectively. The output signals of the latch circuits 66A, 66B and 66C are applied to an OR circuit 96 and a ⅔ logic circuit 98. When a fault occurs in at least one of the ⅔ logic circuits 62A, 62B and 62C, a signal $F_1$ indicating the existence of fault in the logic circuits is supplied from the OR gate 96 to the display 3, etc. When two or more of the ⅔ logic circuits 62A, 62B and 62C become faulty, a signal $F_2$ indicating such state is delivered from the ⅔ logic circuit 98 to the display 3, etc. In other words, when the output of the OR circuit 96 takes the level of "1", the operator is informed of a fault in the ⅔ logic circuits 62A, 62B and 63C. When the output $F_2$ of the ⅔ logic circuit 98 takes the level of "1", the operator is alarmed that the reliability of the system control signal 600 will be completely lost if the next fault occurs.

The majority control circuit shown in FIG. 6 can be formed on one semiconductor chip in the form of an LSI, and therefore can be produced as one circuit part. Further, the use of three switching circuits 61A, 61B and 61C improves the reliability of the control system effectively.

We claim:

1. A redundant control system in which a plurality of equivalent control signals from a plurality of equivalent signal processors are subjected to majority logic operation, to deliver a system control signal, said redundant control system comprising:
    at least three equivalent signal processors connected in parallel for receiving an information signal and for generating respective control signals which will be identical to one another when the processors are operating without fault;
    error detecting means connected to receive said control signals from said signal processor for comparing each of said control signals with each of the other control signals to check for the presence of an abnormal control signal which is different in level from that of the majority of the control signals and to generate an error detection signal on an output line corresponding to said different control signal;
    means for generating a set signal which represents a mode of control upon occurrence of a fault in at least one of said signal processors;
    swithcing means connected to receive said control signals from said signal processors, any error detection signal generated by said error detection means and said set signal for transmitting control signals which are not accompanied by a corresponding error detection signal and for replacing said control signal accompanied by an error detection signal with said set signal; and
    a majority logic circuit connected to receive the outputs of said switching means for performing a majority logic operation among the outputs of said switching means to generate a system control signal.

2. A redundant control system according to claim 1, further comprising a latch circuit for latching the output of said error detecting means, and a masking circuit for preventing said latch circuit from generating an output signal, during a predetermined time period.

3. A redundant control system according to claim 2, further comprising a diagnosing circuit connected to receive the outputs of said switching means and the output of said majority logic circuit for performing a majority logic operation for the outputs of said switching means and for comparing the result of said majority logic operation with the output of said majority logic circuit, to deliver a logic fault signal when the result of said majority logic operation is different from the output of said majority logic circuit.

4. A redundant control system according to claim 1, wherein said switching means includes NOR means connected to receive said control signals and said error detection signal to perform a NOR logic operation on each of the control signals and a corresponding detection signal, AND means connected to receive said error detection signal and said set signal to perform an AND logic operation on each of the detection signal and the set signal, and NOR means connected to receive the output of each one of said NOR means and the output of a corresponding one of said AND means to perform a NOR logic operation.

5. A redundant control system according to claim 4, wherein said AND means includes a series combination of an NAND gate and an inverter.

6. A redundant control system according to claim 1, wherein said error detection signal is applied to said switching means through said signal processor.

7. A redundant control system according to claim 1, further comprising display means for displaying the presence of a fault in accordance with the output of said error detecting circuit.

8. A redundant control system according to claim 1, further comprising equivalent sensors of the same function each supplying an output thereof to a corresponding one of said signal processors to cause said signal processors to deliver said control signals on the basis of the outputs of said sensors.

9. A redundant control system in which three ON-OFF control signals from threee equivalent processors are subjected to a majority logic operation to deliver a majority control signal, said redundant control system comprising:
    three equivalent processors connected in parallel for receiving a common information signal and for generating respective ON-OFF control signals which would be identical to one another when the processors are operating without fault;
    error detecting means connected to said equivalent processors to receive said control signals for comparing each said control signal with each of the other control signals to detect an abnormal control signal which is different from other control signals and for generating three changeover signals correspondingly respectively to said control signals, each of which changeover signals is in an ON state when the associated control signal is abnormal and in an OFF state when the associated control signal is normal;

means for generating a set signal which is preselected to be in an ON or OFF state according to a desired mode of control when a fault occurs in at least one of said processors;

three switching circuits, each of said switching circuits being connected to receive said control signals, said three changeover signals and said set signal and operating to generate three output signals, each output signal of a respective switching circuit being equal to a corresponding one of said control signals when a corresponding one of said changeover signals is in the OFF-state and for converting an ouptut signal into a signal determined by the ON or OFF state of said set signal when the changeover signal corresponding to said output signal is in the ON-state;

three first majority logic circuits corresponding to said switching circuits, each of said first majority logic circuits being connected to receive three outputs from a corresponding one of said switching circuits, to perform a majority logic operation; and a second majority logic circuit connected to receive three outputs from said first majority logic circuits for performing a majority operation to deliver said majority control signal.

10. A redundant control system according to claim 9, said error detecting means including three error detecting circuits corresponding to said switching circuits, each of said error detecting circuits being applied with three output signals from a corresponding one of said switching circuits for putting one of said output signals in the ON-state and putting the remaining output signals in the OFF-state when said one output signal is different in level from the remaining output signals, and three third majority logic circuits corresponding to said control signals, each of said third majority logic circuits being applied with three output signals delivered from said error detecting circuits and corresponding to one of said control signals, for performing a majority operation to detect an error signal from said control signals on the basis of the outputs of said third majority logic circuits.

11. A redundant control system according to claim 10, said errors detecting means further including first latch circuits, each of said first latch circuits being connected between one of said error detecting circuits and said third majority logic circuits for preventing output signals of the error detecting circuit from being applied to said third majority logic circuits, during a predetermined masking time period, to get rid of a transient error signal from the error detecting circuit due to the asynchronism of three output signals of a corresponding switching circuit.

12. A redundant control system according to claim 9, further comprising three diagnosing circuits corresponding to said first majority logic circuits, each of said diagnosing circuits being applied with three output signals of a corresponding one of said switching circuits for performing a majority logic operation to diagnose a corresponding one of said first majority logic circuits on the basis of the comparison between the result of said majority logic operation and the output of said corresponding first majority logic circuit, and a fourth majority logic circuit applied with three output signals from said three diagnosing circuits for performing a majority logic operation to diagnose said third majority logic circuits on the basis of the output of said fourth majority logic circuit.

13. A redundant control system according to claim 12, further comprising second latch circuits, each of said second latch circuits being connected between one of said diagnosing circuits and said fourth majority logic circuit for preventing the output signal of a corresponding one of said diagnosing circuits from being applied to said fourth majority logic circuit, during a predetermined masking time period, to get rid of a transient erroneous output from the diagnosing circuit due to the asynchronism of three output signals of a corresponding switching circuit.

* * * * *